US012673469B2

(12) United States Patent
Taoka et al.

(10) Patent No.: US 12,673,469 B2
(45) Date of Patent: Jul. 7, 2026

(54) RESIN COMPONENT AND MANUFACTURING METHOD THEREOF

(71) Applicants: NICHIA CORPORATION, Anan (JP); Laser Systems Inc., Anan (JP)

(72) Inventors: Ryota Taoka, Komatsushima (JP); Hiroaki Tamemoto, Anan (JP)

(73) Assignees: NICHIA CORPORATION, Anan (JP); Laser Systems Inc., Anan (JP)

( * ) Notice: Subject to any disclaimer, the term of this patent is extended or adjusted under 35 U.S.C. 154(b) by 191 days.

(21) Appl. No.: 18/397,920

(22) Filed: Dec. 27, 2023

(65) Prior Publication Data

US 2024/0336014 A1 Oct. 10, 2024

Related U.S. Application Data

(63) Continuation of application No. PCT/JP2022/019884, filed on May 11, 2022.

(30) Foreign Application Priority Data

Jun. 28, 2021 (JP) ................................. 2021-106930

(51) Int. Cl.
| | |
|---|---|
| *B29C 65/16* | (2006.01) |
| *B29C 65/00* | (2006.01) |
| *B29K 23/00* | (2006.01) |
| *B29K 27/18* | (2006.01) |

(52) U.S. Cl.
CPC ...... *B29C 65/1648* (2013.01); *B29C 65/1664* (2013.01); *B29C 66/1122* (2013.01); *B29C 66/1142* (2013.01); *B29C 66/712* (2013.01); *B29K 2023/00* (2013.01); *B29K 2023/06* (2013.01); *B29K 2023/12* (2013.01); *B29K 2027/18* (2013.01)

(58) Field of Classification Search
CPC ............ B29C 65/1648; B29C 65/1606; B29C 65/1609; B29C 65/1635; B29C 65/1654; B29C 65/1664; B29C 65/7826; B29C 66/1142; B29C 66/43; B29C 66/71
USPC ........................................................ 156/272.8
See application file for complete search history.

(56) References Cited

U.S. PATENT DOCUMENTS

| | | | |
|---|---|---|---|
| 2014/0332157 A1 | 11/2014 | Arai et al. | |
| 2022/0402217 A1* | 12/2022 | Ogawa ................ | B29C 66/9672 |

FOREIGN PATENT DOCUMENTS

| | | |
|---|---|---|
| CN | 108031971 A | 5/2018 |
| JP | 08-294667 A | 11/1996 |
| JP | 09-220765 A | 8/1997 |
| JP | 2005-001172 A | 1/2005 |
| JP | 2005-066629 A | 3/2005 |

(Continued)

*Primary Examiner* — James D Sells
(74) *Attorney, Agent, or Firm* — Spencer Fane LLP

(57) ABSTRACT

A manufacturing method of a resin component includes: providing a first resin member containing a polymer and a second resin member containing a polymer; and joining a first joining portion of the first resin member and a second joining portion of the second resin member to each other. The joining of the first resin member and the second resin member to each other includes irradiating the first joining portion of the first resin member with a laser light having a peak wavelength in a range from 350 nm to 420 nm is emitted in a presence of oxygen so as to cause multiphoton excitation of the first joining portion of the first resin member.

12 Claims, 5 Drawing Sheets

(56)                         References Cited

FOREIGN PATENT DOCUMENTS

| | | | |
|----|----|----|----|
| JP | 2005-074796 | A | 3/2005 |
| JP | 2005-313477 | A | 11/2005 |
| JP | 2010-059308 | A | 3/2010 |
| JP | 2013-119111 | A | 6/2013 |
| JP | 2013-180420 | A | 9/2013 |
| JP | 2016-153215 | A | 8/2016 |
| JP | 2017-087492 | A | 5/2017 |
| JP | 2018-065376 | A | 4/2018 |
| JP | 2019-123153 | A | 7/2019 |

* cited by examiner

RESIN COMPONENT AND MANUFACTURING METHOD THEREOF

CROSS-REFERENCE TO RELATED APPLICATIONS

This application is a continuation application of International Application No. PCT/JP2022/019884, filed on May 11, 2022, which claims priority to Japanese Patent Application No. 2021-106930, filed on Jun. 28, 2021. The entire disclosures of International Application No. PCT/JP2022/019884 and Japanese Patent Application No. 2021-106930 are hereby incorporated herein by reference.

TECHNICAL FIELD

The present disclosure relates to a resin component and a manufacturing method thereof.

BACKGROUND ART

In recent years, in the field of electronic components and devices, attention has been paid to apparatuses and devices in which, not only inorganic materials, such as semiconductors and metals, but also organic materials (resins) are introduced in order to bring out the functions of the electronic components and devices to the maximum. When such an apparatus or device is manufactured, it is required, for example, to join resins to each other.

Here, as a method of joining resins to each other, attention has been paid to a joining method using a laser. However, for example, it is difficult to join, using a laser, olefin-based polymers, such as polyethylene and polypropylene, or fluorine-based polymers containing fluorine to each other. The above-described olefin-based polymers and fluorine-based polymers are mainly constituted of —C—C-bonds, —C—H bonds, and —C—F bonds, and do not have a chromophore. Furthermore, these bonds are strong σ (sigma) bonds, and have difficulty in forming new bonds with other resins or the like. Also, in the σ bond, (σ-σ*) transition occurs due to energy irradiation. For the transition, irradiation with a light in a deep ultraviolet or vacuum ultraviolet region (for example, light having a wavelength of 300 nm or less) is usually necessary.

In addition, in the (σ-σ*) transition, the electrons directly involved in the bond transition from a bonding σ orbital to an antibonding σ* orbital. Therefore, bond dissociation is likely to occur in the transition state. The bond dissociation is also likely to occur due to, for example, the potential energy surface in the (σ-σ*) transition state and the potential energy surface of the dissociation type being extremely close to each other or intersecting with each other.

Furthermore, when the resin is irradiated with a laser light in a short wavelength region, the state of the resin tends to become unstable. For example, when the above-described resin is irradiated with a laser light having a wavelength of 300 nm or less, random bond cleavage is induced, and damage might occur in the region irradiated with the laser light. As a result, there is a possibility that the strength of the resin component decreases or discoloration occurs in the region joined by the laser light. Lasers oscillating at a short wavelength, such as a wavelength of 300 nm or less, include an excimer laser and the third harmonic light of a $Nd^{3+}$: YAG laser. Since these lasers are pulsed operation lasers, they are expensive and the apparatuses thereof tend to be large in size. In addition, pulsed operation lasers having a wavelength of 300 nm or less tend to damage resins.

Moreover, lenses for laser lights having a wavelength of 300 nm or less are all expensive fused silica lenses, and general-purpose glass optical elements (lenses and filters) cannot be used. As a result, an optical microscope cannot be used, and microfabrication with a spatial resolution of a nano/micrometer scale is difficult.

JP 2019-123153 A discloses that to join a resin member containing a fluorine-based polymer to a metal member containing a metal, a mixed solution containing sodium is applied on a surface of the resin member and the application surface is irradiated with a laser light. In this method, after the resin member is modified with sodium, a contact portion of the resin member and the metal member is further irradiated with the laser light to join the resin member and the metal member to each other.

In addition, JP 2013-119111 A discloses that resin members are joined to each other by subjecting the resins to a photo-oxidation process (for example, a UV ozone treatment or an excimer treatment). In this method, the resins subjected to the photo-oxidation process are joined to each other by being overlapped and further irradiated with an ultraviolet laser light or an ultrashort pulsed laser light.

SUMMARY

However, in the joining method disclosed in JP 2019-123153 A and the joining method disclosed in JP 2013-119111 A, it is necessary to treat the resin members with sodium, ozone, or the like before the laser light irradiation. Therefore, an apparatus for the pretreatment is necessary, and cost and labor are also required. Furthermore, in resin components for food packaging applications and precision machinery, elution of additives and the like are strictly restricted. Therefore, resin components joined by using additives as in JP 2019-123153 A have limited usage.

It is an object of the present disclosure to provide a manufacturing method of a resin component that allows efficiently joining olefin-based polymers to each other or fluorine-based polymers to each other without using an additive or performing a special treatment, and a resin component manufactured by such a method.

The present disclosure provides the following manufacturing method of a resin component.

A manufacturing method of a resin component includes: providing a first resin member containing a first olefin-based polymer and a second resin member containing a second olefin-based polymer; and joining the first resin member and the second resin member to each other at a first joining portion of the first resin member and a second joining portion of the second resin member by irradiating the first joining portion of the first resin member with a laser light having a peak wavelength in a range from 350 nm to 420 nm in a presence of oxygen so as to cause multiphoton excitation of the first joining portion of the first resin member.

The present disclosure also provides the following manufacturing method of a resin component.

A manufacturing method of a resin component includes: providing a third resin member containing a first fluorine-based polymer and a fourth resin member containing a second fluorine-based polymer; and joining the third resin member and the fourth resin member to each other at a third joining portion of the third resin member and a fourth joining portion of the fourth resin member by irradiating the third joining portion of the third resin member with a laser light having a peak wavelength in a range from 350 nm to 420 nm in a presence of oxygen so as to cause multiphoton excitation of the third joining portion of the third resin member.

The present disclosure provides the following resin component.

A resin component includes a first resin member containing a first olefin-based polymer and a second resin member containing a second olefin-based polymer, the first resin member and the second resin member being joined to each other; and a modified region in a joining region of the first resin member and the second resin member.

The present disclosure also provides the following resin component.

A resin component includes a third resin member containing a first fluorine-based polymer and a fourth resin member containing a second fluorine-based polymer, the third resin member and the fourth resin member being joined to each other; and a modified region in a joining region of the third resin member and the fourth resin member.

With the manufacturing method of a resin component of the present disclosure, it is possible to efficiently join olefin-based polymers to each other or fluorine-based polymers to each other by a simple method without using an additive or performing a special treatment. Therefore, a desired resin component can be manufactured by joining resin members in various shapes.

DESCRIPTION OF EMBODIMENTS

Figure 1A:
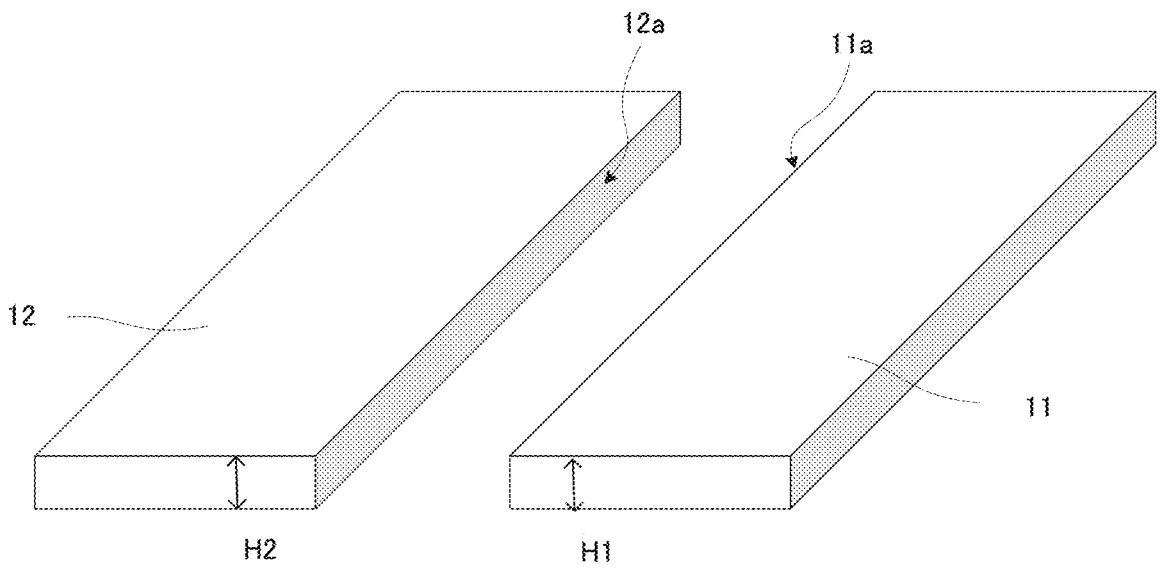
FIGS. 1A and 1B are perspective views showing a joining step according to an embodiment of the present disclosure.

The present disclosure relates to a resin component and a manufacturing method thereof. A first embodiment in which resin members used for manufacturing a resin component contain olefin-based polymers and a second embodiment in which the resin members contain fluorine-based polymers will be separately described below.

1. First Embodiment

In a manufacturing method of a resin component according to the first embodiment of the present disclosure, a step of providing a first resin member containing a first olefin-based polymer and a second resin member containing a second olefin-based polymer (hereinafter also referred to as a "provision step") and a step of joining the first resin member and the second resin member at a first joining portion of the first resin member and a second joining portion of the second resin member (hereinafter also referred to as a "joining step") are performed. In the above-described joining step, the first joining portion of the first resin member is irradiated with a laser light having a peak wavelength in a range from 350 nm to 420 nm in the presence of oxygen so as to cause multiphoton excitation of the first joining portion, that is, the first olefin-based polymer.

Here, in the present specification, the first joining portion of the first resin member refers to a region of the first resin member to be joined to the second resin member. Similarly, the second joining portion of the second resin member refers to a region of the second resin member to be joined to the first resin member.

As described above, conventionally, it is difficult to join resin members containing olefin-based polymers to each other only by irradiation with laser light, and application of an additive or ozone treatment has been performed before irradiation with laser light.

However, as a result of intensive studies conducted by the present inventors, it has been found that when olefin-based polymers are irradiated with a focused laser light having a peak wavelength in a range from 350 nm to 420 nm in the presence of oxygen to cause multiphoton excitation of the olefin-based polymers, the olefin-based polymers can be joined to each other without application of an additive, ozone treatment, or the like. In the present specification, "multiphoton excitation" means that one molecule or one monomer unit absorbs a plurality of photons substantially simultaneously to induce an excitation effect equivalent to that of a wavelength shorter than the incident wavelength. In the method of the present embodiment, usually two-photon excitation occurs. It is to be noted that among olefin-based polymers, for example, polyethylene and polypropylene do not have a light absorption band based on electronic transition at a wavelength of 250 nm or more. Therefore, if a laser light having a peak wavelength in a range from 350 nm to 420 nm is absorbed, the absorption is caused by multiphoton absorption, more specifically, two-photon absorption.

The reason why olefin-based polymers can be joined to each other by the above-described multiphoton excitation is considered as follows. When a focused laser light having a peak wavelength in a range from 350 nm to 420 nm is emitted at a predetermined power density, an olefin-based polymer becomes multiphoton-excited. At this time, if oxygen is present in the atmosphere, the multiphoton-excited olefin-based polymer reacts with the oxygen. Accordingly, due to the bonding, new absorption bands are generated at wavelengths at which olefin-based polymers usually do not have absorptivity (for example, wavelengths in a range from 350 nm to 420 nm). Therefore, the olefin-based polymer is more likely to absorb the laser light. As a result, the olefin-based polymer rises in temperature and melts, or causes partial cleavage of chemical bonds. Accordingly, the olefin-based polymer becomes entangled or forms new bonds with other olefin-based polymers. Thus, the olefin-based polymers are joined to each other. Each step in the manufacturing method of the resin component of the present embodiment will be described below.

Provision Step

In the provision step of the present embodiment, a first resin member containing a first olefin-based polymer and a second resin member containing a second olefin-based polymer are provided. The term "olefin-based polymer" as used in the present specification refers to a polymer in which the amount of a constituent unit derived from an olefin is 50 mol % or more, preferably 70 mol % or more, with respect to the total number of moles of the constituent units of the olefin-based polymer. In addition, the olefin represents an aliphatic unsaturated hydrocarbon, and examples of the olefin include ethylene and α-olefins having the number of carbon atoms in a range from 3 to 24.

Specific examples of the olefin-based polymer include olefin homopolymers, such as polyethylene (including, ultralow-density polyethylene, low-density polyethylene, high-density polyethylene, and the like), polypropylene, polybutene, and polymethylpentene; ethylene-based copolymers, such as ethylene-propylene copolymer, ethylene-butene copolymer, ethylene-hexene copolymer, and ethylene-octene copolymer; and propylene-based copolymers, such as propylene-ethylene copolymer and propylene-butene copolymer. However, the olefin-based polymer is not limited to these, and may be, for example, a copolymer of three or more types of olefins. Furthermore, a constituent unit derived from a monomer other than ethylene or α-olefins may be contained as a part. Among those described above, from the viewpoint of processability, versatility of the resin component, and the like, polyethylene or polypropylene is especially preferable.

Here, the first resin member and the second resin member may each contain only one type of olefin-based polymer, or may contain two or more types of olefin-based polymers. Furthermore, the type of the first olefin-based polymer contained in the first resin member and the type of the second olefin-based polymer contained in the second resin member may be the same or different. Even if the types are different, the olefin-based polymers have high affinity with each other, and can be joined to each other in a joining step described later.

In addition to the first olefin-based polymer and the second olefin-based polymer, the first resin member and the second resin member may further contain a colorant or another resin as long as the object and effect of the present embodiment are not impaired.

In addition, the shapes of the first resin member and the second resin member are not particularly limited, and are appropriately selected according to the type of a desired resin component, and the like. In addition, the shapes of the first joining portion of the first resin member and the second joining portion of the second resin member are not particularly limited, and are appropriately selected in accordance with the shape and structure of a desired resin component. The first joining portion and the second joining portion may have, for example, a flat surface, a curved surface, or a protrusion and a recession corresponding to each other.

Joining Step

The joining step is a step of joining the first joining portion of the first resin member and the second joining portion of the second resin member. At least the first joining portion of the first resin member is irradiated with a laser light having a peak wavelength in a range from 350 nm to 420 nm in the presence of oxygen so as to cause multiphoton excitation of the first joining portion (first olefin-based polymer). The first joining portion and the second joining portion are brought into contact with each other before, while, or after the first joining portion is irradiated with the laser light. In the present specification, "in the presence of oxygen" means that oxygen is present in the vicinity of the focal position of the laser light, and refers to, for example, a case in which the vicinity of the focal position of the laser light is in an air atmosphere or an ozone atmosphere.

In this step, not only the first joining portion of the first resin member but also the second joining portion of the second resin member may be irradiated with the laser light to cause multiphoton excitation of the second olefin-based polymer in the second joining portion. In this case, the laser light emitted to the second joining portion may be the same as or different from the laser light emitted to the first joining portion. In addition, the first joining portion and the second joining portion may be simultaneously irradiated with the laser light, or may be sequentially irradiated with the laser light.

Furthermore, the timing at which the laser light is emitted, and the timing at which the first joining portion and the second joining portion are brought into contact with each other may be the same or different. They are appropriately selected according to the shapes of the first joining portion and the second joining portion, the irradiation direction of the laser light, and the like. For example, the laser light irradiation may be performed after the first joining portion and the second joining portion are brought into contact with each other, or the laser light irradiation may be performed in a state in which the first joining portion and the second joining portion are arranged with a clearance therebetween, and subsequently, the first joining portion and the second joining portion may be brought into contact with each other.

Two irradiation modes of the laser light in this step will be described below, but the irradiation method of the laser light and the contact method of the first joining portion and the second joining portion in this step are not limited thereto.

Figure 1B:
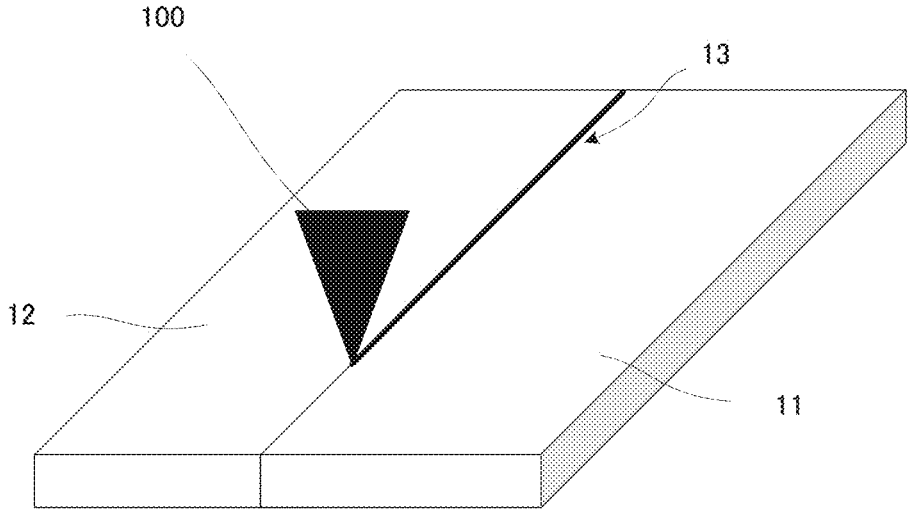

FIGS. 1A and 1B are perspective views showing a mode in which the first joining portion of the first resin member and the second joining portion of the second resin member are brought into contact with each other, and subsequently, the first joining portion and the second joining portion are simultaneously irradiated with a laser light.

As illustrated in FIG. 1A, when the widths of a first joining portion 11a of a first resin member 11 and a second joining portion 12a of a second resin member 12 (in the mode illustrated in FIG. 1A, a height H1 of the first resin member 11 and a height H2 of the second resin member 12) are small, for example, as illustrated in FIG. 1B, the first joining portion 11a of the first resin member 11 and the second joining portion 12a of the second resin member 12 may be arranged in contact with each other, and subsequently, an interface between the first joining portion 11a and the second joining portion 12a may be irradiated with a laser light 100.

In this mode, the first joining portion 11a and the second joining portion 12a are brought into contact with each other, and a position at which oxygen is present in the first joining portion 11a and the second joining portion 12a is set as the focal point of the laser light 100. Therefore, oxygen is present in the vicinity of the focal point of the laser light 100, and the first resin member 11 and the second resin member 12 can be joined to each other as described above.

It is to be noted that, in this mode, the direction from which the laser light 100 is emitted is not particularly limited but, as illustrated in FIG. 1B, the laser light 100 is preferably emitted substantially parallel to the interface between the first joining portion 11a and the second joining portion 12a. When the laser light 100 is emitted in this manner, energy loss is small, and the first resin member 11 and the second resin member 12 can be joined to each other even with a relatively low power density of the laser light 100.

The focal position of the laser light 100 may be located at any position on the interface between the first joining portion 11*a* and the second joining portion 12*a*. For example, the focal position of the laser light 100 may be located on the front surface side or the back surface side of the first resin member 11 and the second resin member 12, or may be located near a thickness-direction center of the first resin member 11 and the second resin member 12.

The beam diameter of the laser light 100 emitted to the interface between the first joining portion 11*a* and the second joining portion 12*a* is not particularly limited, but is preferably in a range from 200 μm to 500 μm, and more preferably in a range from 200 μm to 400 μm on the interface between the first joining portion 11*a* and the second joining portion 12*a*. When the beam diameter of the laser light is in this range, the olefin-based polymer can be easily subjected to multiphoton excitation. In addition, the width of a modified region 13 described later is sufficiently narrow, and thus the modified region 13 is inconspicuous.

The scanning direction of the laser light 100 is appropriately selected according to the shape of the interface between the first joining portion 11*a* and the second joining portion 12*a*, and is usually a direction along the interface therebetween. In FIG. 1B, the surfaces of the first resin member 11 and the second resin member 12 are scanned, with the laser light 100, from the upper right to the lower left of the drawing.

It is to be noted that, in a region (also referred to as a "joining region" in the present specification) in which the first resin member 11 and the second resin member are joined to each other by being irradiated with the laser light 100, a region 13 (also referred to as a "modified region" in the present specification) in which the first resin member 11 and the second resin member 12 are modified by the laser light 100 is generated. When the laser light 100 is emitted as in the present mode, the width of the modified region 13 (the length in the short side direction of the modified region when observed from the direction in which the laser light is emitted) is usually 300 μm or less. It is to be noted that, when this modified region 13 is analyzed by Raman spectroscopy, a peak is observed in a range from 3100 cm$^{-1}$ to 3800 cm$^{-1}$. This peak is considered to be derived from a bond generated by a reaction of the olefin-based polymer with oxygen. Peaks are also observed in a range from 1500 cm$^{-1}$ to 2500 cm$^{-1}$ These are considered to be attributable to —C—C— triple bonds and double bonds, and are considered to indicate bond cleavage resulting from light absorption.

Figure 2A:
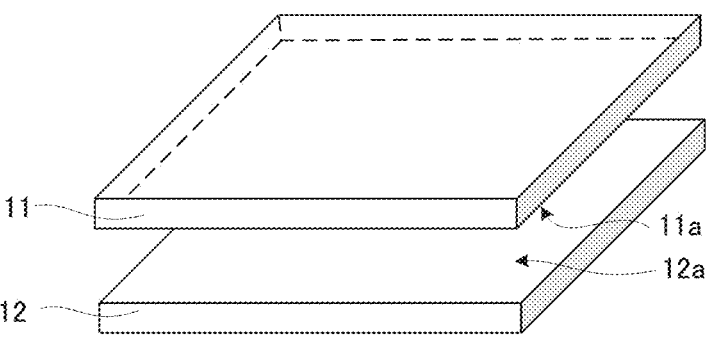
FIGS. 2A to 2C are perspective views showing a joining step according to an embodiment of the present disclosure.
Figure 2B:
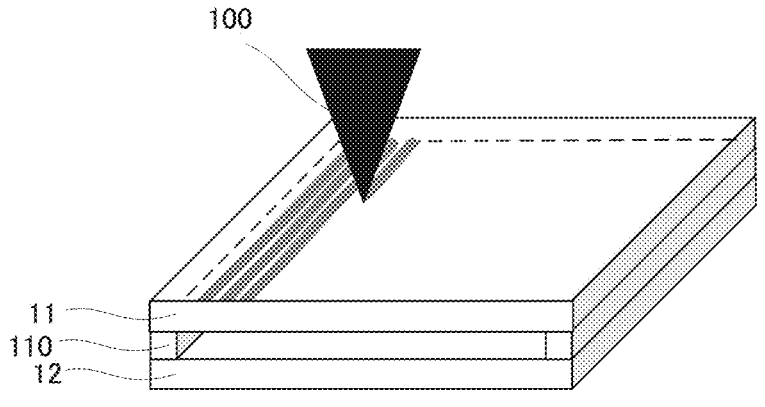
Figure 2C:
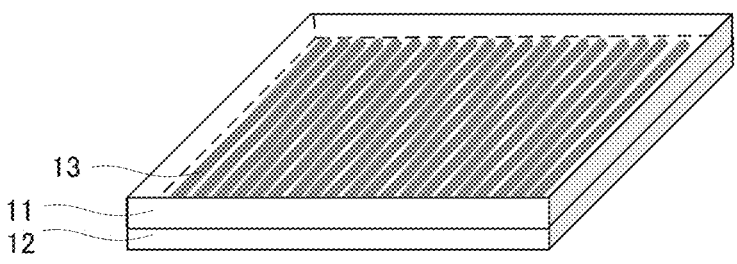

On the other hand, FIGS. 2A to 2C are perspective views showing a mode in which the first joining portion 11*a* is irradiated with the laser light 100 in a state in which a clearance is provided between the first joining portion 11*a* of the first resin member 11 and the second joining portion 12*a* of the second resin member 12, and subsequently, the first joining portion and the second joining portion are brought into contact with each other. It is to be noted that, in FIGS. 2A to 2C, for convenience, the first resin member 11 is transparent to the laser light 100.

As illustrated in FIG. 2A, when the areas of the first joining portion 11*a* of the first resin member 11 and the second joining portion 12*a* of the second resin member 12 are large and the lengths of the first joining portion 11*a* and the second joining portion 12*a* in both directions are long, for example, as illustrated in FIG. 2B, it is preferable to irradiate at least the first joining portion 11*a* with the laser light 100 in a state in which a clearance is provided between the first joining portion 11*a* of the first resin member 11 and the second joining portion 12*a* of the second resin member

12. According to this method, since a sufficient amount of oxygen is present in the vicinity of the first joining portion 11*a*, the first olefin-based polymer in the multiphoton-excited first joining portion 11*a* can react with the surrounding oxygen when the first joining portion 11*a* is irradiated with the laser light 100. Therefore, as described above, the laser light can be sufficiently absorbed by the first joining portion 11*a*, and therefore the first resin member 11 and the second resin member 12 can be joined to each other.

Here, as a method of arranging the first joining portion 11*a* and the second joining portion 12*a* with a clearance therebetween, for example, a method of using a spacer 110 between the first joining portion 11*a* and the second joining portion 12*a* as illustrated in FIG. 2B can be exemplified. However, the first joining portion 11*a* and the second joining portion 12*a* need not be face each other and irradiated with the laser light 100. For example, only the first resin member 11 may be disposed in an apparatus for irradiation with laser light and the first joining portion 11*a* may be irradiated with the laser light 100.

In this mode, the direction from which the laser light 100 is emitted is not particularly limited, and is appropriately selected according to the laser light transmissivity of the first resin member 11 and the second resin member 12, and the like. For example, when the first resin member 11 is transmissive to the laser light, as illustrated in FIG. 2B, the laser light 100 can be emitted from a side of a surface of the first resin member 11 opposite to the first joining portion 11*a* and transmitted through the first resin member 11. Also, when the second resin member 12 has laser light transmissivity, the laser light 100 can be emitted from the second resin member side. Furthermore, the laser light 100 may be emitted from a side of the first resin member 11 or the second resin member 12.

The focal position of the laser light 100 is usually preferably in the vicinity of the surface of the first joining portion 11*a*. In this case, the beam diameter of the laser light on the surface of the first joining portion 11*a* is preferably in a range from 200 μm to 500 μm, more preferably in a range from 200 μm to 400 μm. When the beam diameter of the laser light is 200 μm or more, it is easy to efficiently irradiate the entire first joining portion 11*a* of the first resin member 11 with the laser light 100. On the other hand, when the beam diameter of the laser light 100 is 500 μm or less, it is easy to irradiate only a desired region with the laser light 100.

The scanning direction and the scanning pattern of the laser light 100 are appropriately selected according to the shape and the area of the first joining portion 11*a*. In FIG. 2B, scanning with the laser light 100 in a plurality of lines is performed.

In this mode, after the first joining portion 11*a* of the first resin member 11 is irradiated with the laser light 100, the spacer 110 is removed, and the first joining portion 11*a* of the first resin member 11 in which the first olefin-based polymer has been multiphoton-excited is brought into contact with the second joining portion 12*a* of the second resin member 12. At this time, pressure may be applied to the contact surfaces of the first joining portion 11*a* and the second joining portion 12*a*, as necessary.

It is to be noted that, in this mode, the time from the start of emitting the laser light 100 to the contact of the first joining portion 11*a* and the second joining portion 12*a* is 3 seconds or less, and more preferably 1 second or less. When the above-described time is 3 seconds or less, damage to the resins by the laser light 100 can be suppressed while firmly joining the first olefin-based polymer subjected to multiphoton excitation and the second olefin-based polymer.

In addition, in the case in which the first resin member and the second resin member are joined to each other in the same manner as or similar manner to that in this mode, the first joining portion 11a of the first resin member 11 and the second joining portion 12a of the second resin member 12 may be brought into contact with each other, and subsequently, the region in which the first resin member 11 and the second resin member 12 are in contact with each other may be irradiated with the laser light 100. Even when the first resin member 11 and the second resin member 12 are in contact with each other, as long as oxygen is present between the first resin member 11 and the second resin member 12, the regions in which the first resin member 11 and the second resin member 12 are in contact with each other can be joined to each other.

It is to be noted that, even in these modes, in the joining region in which the first resin member 11 and the second resin member 12 are joined to each other by being irradiated with the laser light 100, the modified region 13 in which the first resin member 11 is modified by the laser light 100 is formed. When the laser light is emitted as in these modes, the width of the modified region 13 (the length in the short side direction of the modified region when observed from the direction in which the laser light is emitted) is usually 300 μm or less. The width of this modified region 13 can be determined by observing the joining region from the first resin member 11 side or the second resin member 12 side, or by detaching the first resin member 11 and the second resin member 12 and observing the detached surfaces.

In addition, when this modified region 13 is analyzed by Raman spectroscopy, a peak is observed in a range from $3100 \text{ cm}^{-1}$ to $3800 \text{ cm}^{-1}$. This peak is considered to be derived from a bond generated by a reaction of the olefin-based polymer with oxygen. Peaks are also observed in a range from $1500 \text{ cm}^{-1}$ to $2500 \text{ cm}^{-1}$. These are considered to be attributable to —C—C— triple bonds and double bonds, and are considered to indicate bond cleavage resulting from light absorption.

Here, in any of the above-described modes, the power density of the laser light 100 is adjusted so as to cause multiphoton excitation of the first olefin-based polymer and the second olefin-based polymer. The power density required for causing multiphoton excitation of the first olefin-based polymer and the second olefin-based polymer varies depending on the peak wavelength of the laser light 100.

To be more specific, it can be divided into three cases: emitting a laser light having a peak wavelength in a range from 350 nm to less than 390 nm; emitting a laser light having a peak wavelength in a range from 390 nm to 420 nm; and combining a laser light having a peak wavelength in a range from 350 nm to less than 390 nm and a laser light having a peak wavelength in a range from 390 nm to 420 nm.

For example, when a laser light having a peak wavelength in a range from 350 nm to less than 390 nm is emitted and a laser light having a peak wavelength in a range from 390 nm to 420 nm is not emitted, it is preferable to emit at least a laser light having a peak wavelength in a range from 350 nm to less than 390 nm and a power density on the surface of the first joining portion 11a of $0.45 \text{ kW/cm}^2$ or more (hereinafter also referred to as a "first laser light"). It is to be noted that, the power density on the surface of the first joining portion 11a can be determined by dividing a set power value of a laser-light irradiation apparatus by the area of the region in which the laser light is focused. The area of the region in which the laser light is focused can be calculated from the beam diameter of the region in which the laser light is focused. It is to be noted that, in the calculation of the power density in the present specification, absorption of laser light by the first resin member and the second resin member and the like are not taken into consideration. With this first laser light, multiphoton excitation of the first olefin-based polymer in the first resin member 11 can be generated. At this time, a laser light having a peak wavelength in a range from more than 420 nm to 460 nm (hereinafter also referred to as a "fifth laser light") may be emitted together with the first laser light. In general, olefin-based polymers tend not to have absorptivity at wavelengths of more than 420 nm, but when the multiphoton-excited olefin-based polymer reacts with oxygen, lights having wavelengths of more than 420 nm can also be easily absorbed. It is to be noted that, when a laser light having a peak wavelength in a range from 350 nm to less than 390 nm is emitted alone, the power density of the laser light is more preferably $0.7 \text{ kW/cm}^2$ or more.

On the other hand, when a laser light having a peak wavelength in a range from 390 nm to 420 nm is emitted and a laser light having a peak wavelength in a range from 350 nm to less than 390 nm is not emitted, it is preferable to emit a laser light having a peak wavelength in a range from 390 nm to 420 nm and a power density on the surface of the first joining portion 11a of $0.85 \text{ kW/cm}^2$ or more (hereinafter also referred to as a "second laser light"). With this second laser light, multiphoton excitation of the first olefin-based polymer in the first resin member 11 can be generated. Also in this case, together with the second laser light, the fifth laser light having a peak wavelength in a range from more than 420 nm to 460 nm may be emitted. It is to be noted that, when a laser light having a peak wavelength in a range from 390 nm to 420 nm is emitted alone, the power density of the laser light is more preferably $1.13 \text{ kW/cm}^2$ or more.

When a laser light having a peak wavelength in a range from 350 nm to less than 390 nm and a laser light having a peak wavelength in a range from 390 nm to 420 nm are combined, it is preferable to emit a laser light having a peak wavelength in a range from 350 nm to less than 390 nm and a power density on the surface of the first joining portion 11a of $0.45 \text{ kW/cm}^2$ or more (hereinafter also referred to as a "third laser light") and a laser light having a peak wavelength in a range from 390 nm to 420 nm and a power density on the surface of the first joining portion 11a of $0.45 \text{ kW/cm}^2$ or more (hereinafter also referred to as a "fourth laser light"). It is to be noted that the irradiation timing and the irradiation time of the third laser light and the fourth laser light may be the same or different. However, it is preferable to simultaneously emit the third laser light and the fourth laser light, and it is preferable to emit both the third laser light and the fourth laser light at least for a certain period of time.

Also in this case, together with the third laser light and the fourth laser light, the fifth laser light having a peak wavelength in a range from more than 420 nm to 460 nm may be emitted.

Here, any of the above-described first laser light to the fifth laser light may be a continuous-wave laser light or a pulsed operation laser light. From the viewpoint of allowing a desired region to be continuously irradiated with the laser light, the continuous-wave laser light is more preferable. In addition, by using the continuous-wave laser light, damage to the resin members is easily suppressed compared with the case of using the pulsed operation laser light.

When laser lights having two or more peak wavelengths are emitted, the laser lights may be emitted from the same axial direction or from different directions. The above-described laser light irradiation can be performed by a laser-light irradiation apparatus including a known laser-light irradiation system.

The above-described irradiation time of the laser light is appropriately selected according to the oscillation method of the laser light, and the like, and is preferably in a range from 1 second to 3 seconds. When the time is 1 second or more, the first resin member and the second resin member can be firmly joined to each other. On the other hand, when the time is 3 seconds or less, damage to the resins due to the laser light can be suppressed while efficiently manufacturing the resin component.

Effects

With the manufacturing method of a resin component of the present embodiment, the first resin member containing the first olefin-based polymer and the second resin member containing the second olefin-based polymer can be joined to each other only by irradiation with laser light without performing application of an additive or a special treatment, such as an ozone treatment, in advance. With this method, a special apparatus, an additive, or the like is not necessary, and it is very effective from the viewpoint of cost and manufacturing efficiency of the resin component.

Furthermore, in general, the oscillation wavelength of a high-power laser optical system is usually in a range from 400 nm to 1600 nm. Also, in general, a laser optical system having an oscillation wavelength of 400 nm or less has a low output in order to avoid internal damage due to the wavelength being a short wavelength. Although olefin-based polymers are unlikely to absorb light having a wavelength of 400 nm or more, by causing multiphoton excitation in the presence of oxygen, the absorption of laser light having a wavelength of 400 nm or more becomes possible, and the use of a high-power laser optical system also becomes possible.

2. Second Embodiment

In the manufacturing method of a resin component according to the second embodiment of the present disclosure, a step of providing a third resin member containing a first fluorine-based polymer and a fourth resin member containing a second fluorine-based polymer (hereinafter also referred to as a "provision step") and a step of joining the third resin member and the fourth resin member at a third joining portion of the third resin member and a fourth joining portion of the fourth resin member (hereinafter also referred to as a "joining step") are performed. The third resin member is also referred to as a first fluororesin member. The fourth resin member is also referred to as a second fluororesin member. The third joining portion is also referred to as a first joining portion of the first fluororesin member. The fourth joining portion is also referred to as a second joining portion of the second fluororesin member. In the above-described joining step, the third joining portion of the third resin member is irradiated with a laser light having a peak wavelength in a range from 350 nm to 420 nm in the presence of oxygen so as to cause multiphoton excitation of the above-described first fluorine-based polymer.

Here, in the present specification, the third joining portion of the third resin member refers to a region of the third resin member to be joined to the fourth resin member. Similarly, the fourth joining portion of the fourth resin member refers to a region of the fourth resin member to be joined to the third resin member.

As in the case of the olefin-based polymer, in the conventional method, it is difficult to join resin members containing fluorine-based polymers to each other only by irradiation with laser light, and application of an additive or ozone treatment has been performed before irradiation with laser light.

However, as a result of intensive studies conducted by the present inventors, it has been found that when fluorine-based polymers are irradiated with a laser light having a peak wavelength in a range from 350 nm to 420 nm in the presence of oxygen to cause multiphoton excitation of the fluorine-based polymers, the fluorine-based polymers can be joined to each other without application of an additive, ozone treatment, or the like. The reason can be considered as follows. When irradiation with a laser light having a peak wavelength in a range from 350 nm to 420 nm is performed at a predetermined power density, the fluorine-based polymer is multiphoton-excited. At this time, if oxygen is present in the atmosphere, the multiphoton-excited fluorine-based polymer reacts with the oxygen. Then, due to this bonding, new absorption bands are generated at wavelengths at which fluorine-based polymers usually do not have absorptivity (for example, wavelengths in a range from 350 nm to 420 nm). Therefore, the fluorine-based polymer is even more likely to absorb laser light. Accordingly, the fluorine-based polymer rises in temperature and melts, or causes partial cleavage of a chemical bond. As a result, the fluorine-based polymer becomes entangled or forms new bonds with other fluorine-based polymers. This is considered to cause the fluorine-based polymers to be joined to each other. It is to be noted that, in general, a fluorine resin does not have a light absorption band based on electronic transition at a wavelength of 300 nm or more. Therefore, if a laser light having a peak wavelength in a range from 350 nm to 420 nm is absorbed, the absorption is caused by multiphoton absorption, more specifically, two-photon absorption. Each step of the present embodiment will be described below.

Provision Step

In the provision step of the present embodiment, the third resin member containing the first fluorine-based polymer and the fourth resin member containing the second fluorine-based polymer are provided. The term "fluorine-based polymer" as used in the present specification refers to a polymer having constituent unit containing a fluorine atom, in which the amount of the constituent unit containing a fluorine atom is 50 mol % or more with respect to the total number of moles of the constituent units of the fluorine-based polymer. The fluorine-based polymer may partly have a constituent unit not containing a fluorine atom as a part.

Examples of the fluorine-based polymer include polytetrafluoroethylene (PTFE), ethylene-tetrafluoroethylene copolymer (ETFE), perfluoroalkoxy alkane (PFA), perfluoro ethylene-propene copolymer (FEP), polyvinylidene fluoride (PVDF), polychlorotrifluoroethylene (PCTFE), and ethylene-chlorotrifluoroethylene copolymer (ECTFE).

Among those described above, from the viewpoint of versatility, processability, and the like, polytetrafluoroethylene is especially preferable. It is to be noted that the type of the first fluorine-based polymer contained in the third resin member and the type of the second fluorine-based polymer contained in the fourth resin member may be the same or different. Even if the types are different, the fluorine-based polymers have high affinity with each other, and can be joined to each other in a joining step described later.

In addition to the first fluorine-based polymer and the second fluorine-based polymer, the third resin member and the fourth resin member may further contain a colorant or another resin as long as the object and effect of the present embodiment are not impaired.

In addition, the shapes of the third resin member and the fourth resin member are not particularly limited, and are appropriately selected according to the type of a desired resin component, and the like. In addition, the shapes of the third joining portion of the third resin member and the fourth joining portion of the fourth resin member are not particularly limited, and are appropriately selected in accordance with the shape and structure of the desired resin component. The third joining portion and the fourth joining portion may have, for example, a flat surface, a curved surface, or a protrusion and a recession corresponding to each other.

Joining Step

The joining step is a step of joining the third joining portion of the third resin member and the fourth joining portion of the fourth resin member. At least the third joining portion of the third resin member is irradiated with a laser light having a peak wavelength in a range from 350 nm to 420 nm in the presence of oxygen so as to cause multiphoton excitation of the third joining portion (the first fluorine-based polymer). The third joining portion and the fourth joining portion are brought into contact with each other before, during, or after the third joining portion is irradiated with the laser light.

In this step, not only the third joining portion of the third resin member but also the fourth joining portion of the fourth resin member may be irradiated with the laser light to cause multiphoton excitation of the second fluorine-based polymer in the fourth joining portion. In this case, the laser light emitted to the fourth joining portion may be the same as or different from the laser light emitted to the third joining portion. In addition, the third joining portion and the fourth joining portion may be simultaneously irradiated with the laser light, or may be sequentially irradiated with the laser light.

Furthermore, the timing at which the laser light is emitted, and the timing at which the third joining portion and the fourth joining portion are brought into contact with each other may be the same or different. They are appropriately selected according to the shapes of the third joining portion and the fourth joining portion, the irradiation direction of the laser light, and the like. For example, the laser light irradiation may be performed after the third joining portion and the fourth joining portion are brought into contact with each other, or the laser light irradiation may be performed in a state in which the third joining portion and the fourth joining portion are arranged with a clearance therebetween, and subsequently, the third joining portion and the fourth joining portion may be brought into contact with each other.

A specific irradiation method of the laser light, a contact method of the third resin member and the fourth resin member, a preferable beam diameter of the laser light, and the like are the same as those in the first embodiment described above, and therefore a detailed description thereof will be omitted here.

A modified region in which the third resin member and the fourth resin member are modified by the laser light 100 is also formed in the joining region of the resin component manufactured in the present embodiment. The width of this modified region (the length in the short side direction of the modified region when observed from the direction in which the laser light is emitted) is usually 300 μm or less. It is to be noted that, when this modified region 13 is analyzed by Raman spectroscopy, Raman-scattered signals are observed in a range from 1500 cm$^{-1}$ to 4000 cm$^{-1}$. These Raman-scattered signals are considered to be derived from an OH bond generated by a reaction of the fluorine-based polymer with oxygen.

Here, the power density of the laser light emitted in the present embodiment is adjusted so as to cause multiphoton excitation of the first fluorine-based polymer and the second fluorine-based polymer. The power density required for causing multiphoton excitation of the first fluorine-based polymer and the second fluorine-based polymer varies depending on the peak wavelength of the laser light 100.

To be more specific, it can be divided into three cases: emitting a laser light having a peak wavelength in a range from 350 nm to less than 390 nm; emitting a laser light having a peak wavelength in a range from 390 nm to 420 nm; and combining a laser light having a peak wavelength in a range from 350 nm to less than 390 nm and a laser light having a peak wavelength in a range from 390 nm to 420 nm.

For example, when a laser light having a peak wavelength in a range from 350 nm to less than 390 nm is emitted and a laser light having a peak wavelength in a range from 390 nm to 420 nm is not emitted, it is preferable to emit at least a laser light having a peak wavelength in a range from 350 nm to less than 390 nm and a power density on the third joining portion surface of 0.45 kW/cm$^2$ or more (hereinafter also referred to as a "sixth laser light"). The power density on the third joining portion surface can be determined in the same manner as that in the first embodiment. With this sixth laser light, multiphoton excitation of the first fluorine-based polymer in the third resin member can be performed. It is to be noted that, at this time, a laser light having a peak wavelength in a range from more than 420 nm to 460 nm (hereinafter also referred to as a "tenth laser light") may be emitted together with the sixth laser light. In general, fluorine-based polymers tend not to have absorptivity at wavelengths of more than 420 nm, but when the above-described multiphoton-excited fluorine-based polymer reacts with oxygen, lights at wavelengths of more than 420 nm are also easily absorbed. It is to be noted that, when a laser light having a peak wavelength in a range from 350 nm to 390 nm is emitted alone, the power density of the laser light is more preferably 0.9 kW/cm$^2$ or more.

On the other hand, when a laser light having a peak wavelength in a range from 390 nm to 420 nm is emitted and a laser light having a peak wavelength in a range from 350 nm to less than 390 nm is not emitted, it is preferable to emit a laser light having a peak wavelength in a range from 390 nm to 420 nm and a power density on the third joining portion surface of 1.64 kW/cm$^2$ or more (hereinafter also referred to as a "seventh laser light"). With this seventh laser light, multiphoton excitation of the first fluorine-based polymer in the third resin member can be performed. Also in this case, together with the seventh laser light, the tenth laser light having a peak wavelength in a range from more than 420 nm to 460 nm may be emitted. It is to be noted that when a laser light having a peak wavelength in a range from 390 nm to 420 nm is emitted alone, the power density of the laser light is more preferably 2.2 kW/cm$^2$ or more.

When a laser light having a peak wavelength in a range from 350 nm to less than 390 nm and a laser light having a peak wavelength in a range from 390 nm to 420 nm are combined, it is preferable to emit a laser light having a peak wavelength in a range from 350 nm to less than 390 nm and a power density on the third joining portion surface of 0.45 kW/cm² or more (hereinafter also referred to as an "eighth laser light") and a laser light having a peak wavelength in a range from 390 nm to 420 nm and a power density on the third joining portion surface of 1.69 kW/cm² or more (hereinafter also referred to as a "ninth laser light"). It is to be noted that the irradiation timing and the irradiation time of the eighth laser light and the ninth laser light may be the same or different. However, it is preferable to simultaneously emit the eighth laser light and the ninth laser light, and it is preferable to emit both the eighth laser light and the ninth laser light at least for a certain period of time.

Also in this case, together with the eighth laser light and the ninth laser light, the tenth laser light having a peak wavelength in a range from more than 420 nm to 460 nm may be emitted.

It is to be noted that any of the above-described sixth laser light to the tenth laser light may be a continuous-wave laser light or a pulsed operation laser light. From the viewpoint of allowing a desired region to be continuously irradiated with the laser light, the continuous-wave laser light is more preferable.

Here, when laser lights having two or more peak wavelengths are emitted, the laser lights may be emitted from the same axial direction or from different directions. The above-described laser light irradiation can be performed by a laser-light irradiation apparatus including a known laser-light irradiation system.

The above-described irradiation time of the laser light is appropriately selected according to the oscillation method of the laser light, and the like, and is preferably in a range from 1 second to 3 seconds. When the time is 1 second or more, the third resin member and the fourth resin member can be firmly joined to each other. On the other hand, when the time is 3 seconds or less, damage to the resins due to the laser light can be suppressed while efficiently manufacturing the resin component.

Effects

With the manufacturing method of a resin component of the present embodiment, the third resin member containing the first fluorine-based polymer and the fourth resin member containing the second fluorine-based polymer can be joined to each other only by irradiation with laser light without performing application of an additive, ozone treatment, or the like in advance. With this method, a special apparatus, an additive, or the like is not necessary, and it is very effective from the viewpoint of cost and manufacturing efficiency of the resin component.

Furthermore, in general, the oscillation wavelength of a high-power laser optical system is usually in a range from 400 nm to 1600 nm. Also, in general, a laser optical system having an oscillation wavelength of 400 nm or less has a low output in order to avoid internal damage due to the wavelength being a short wavelength. Although fluorine-based polymers are unlikely to absorb light having a wavelength of 400 nm or more, by causing multiphoton excitation, the absorption of laser light having a wavelength of 400 nm or more becomes possible, and the use of a high-power laser optical system also becomes possible.

3. Usage of Resin Component

The usage of the resin component produced by the above-described method is not particularly limited. The resin component obtained by joining the first resin member and the second resin member containing olefin-based polymers can be applied to components in any fields in which olefin-based polymers have been conventionally used. Examples thereof include clothing, various packaging containers, medical equipment, and covering materials for electric cables and optical fibers. In the above-described manufacturing method of a resin component, since an additive or the like is not used when the first resin member and the second resin member are joined to each other, the resin component can also be used for, for example, a packaging container for food.

The resin component obtained by joining the third resin member and the fourth resin member containing the fluorine-based polymers can be applied to any field in which fluorine-based polymers have been conventionally used. For example, it can be used for various articles for manufacturing semiconductor devices. In a manufacturing process of a semiconductor, various types of organic solvents, strong acidic aqueous solutions, and strong alkaline aqueous solutions are used. However, in the resin component manufactured by the above-described method, an adhesive layer, an additive, or the like is not used in the joining portions of the third resin member and the fourth resin member, and thus the component can have very good chemical resistance.

Examples of various articles for manufacturing semiconductor devices include a container for storing a chemical solution, a pipe for feeding a liquid, a joint of a pipe, a tank lining, a wafer carrier, a valve, a pump, a diaphragm, and a filter housing. Examples of applications of the resin component obtained by joining the third resin member and the fourth resin member containing the fluorine-based polymers include a mechanical driving component, a bearing, and a washer. Furthermore, examples of applications of the resin component obtained by joining the third resin member and the fourth resin member containing the fluorine-based polymers include components for electric and electronic fields that are required to have high electrical insulation properties and flame retardancy. Examples thereof include cables used in home appliances, information communication equipment, automobiles, aeronautics, and space industry cables.

EXAMPLES

The embodiments of the present disclosure will be described in detail below with reference to Examples, but the present disclosure is not limited by these Examples.

(Experimental Example 1) Joining 1 of resin members containing olefin-based polymers A first joining portion of a plate-shaped first resin member (manufactured by AS ONE Corporation, thickness: 0.2 mm) and a second joining portion of a plate-shaped second resin member (manufactured by AS ONE Corporation, thickness: 0.2 mm) are faced with each other with a spacer (manufactured by MISUMI Group Inc., thickness: 0.3 mm) therebetween. In the present example, the first resin member and the second resin member are formed of polyethylene. A laser light(s) is linearly emitted along the first joining portion of the first resin member at atmospheric pressure under the following conditions. A focal position is set on the first joining portion surface, that is, a surface of the first resin member on the second resin member side. Subsequently, the spacer is removed, and the first resin member and the second resin member are brought into tight contact with each other. It is to be noted that the time from the start of laser light irradiation to the tight contact of the first resin member and the second resin member is within 3 seconds. It is confirmed whether the first resin member and the second resin member after the joining are joined to each other. The results are shown in Table 1 below.

Condition 1 (Example): Irradiation with only Laser light 1 (wavelength: 375 nm, power density: 1.2 kW/cm$^2$)

Condition 2 (Example): Irradiation with only Laser light 2 (wavelength: 405 nm, power density: 1.69 kW/cm$^2$)

Condition 3 (Comparative Example): Irradiation with only Laser light 5 (wavelength: 450 nm, power density: 2.6 kW/cm$^2$)

Condition 4 (Example): Simultaneous irradiation with Laser light 3 (wavelength: 375 nm, power density: 0.45 kW/cm$^2$) and Laser light 4 (wavelength: 405 nm, power density: 1.58 kW/cm$^2$)

Condition 5 (Example): Simultaneous irradiation with Laser light 1 (wavelength: 375 nm, power density: 0.6 kW/cm$^2$) and Laser light 5 (wavelength: 450 nm, power density: 2.5 kW/cm$^2$)

Condition 6 (Example): Simultaneous irradiation with Laser light 2 (wavelength: 405 nm, power density: 1.64 kW/cm$^2$) and Laser light 5 (wavelength: 450 nm, power density: 2.60 kW/cm$^2$)

It is to be noted that the following types of laser lights and a focusing optical system are used.

Laser lights 1 and 3: Semiconductor laser lights having a wavelength of 375 nm (continuous wave operation type)

Laser lights 2 and 4: Semiconductor laser lights having a wavelength of 405 nm (continuous wave operation type)

Laser light 5: Semiconductor laser light having a wavelength of 450 nm (continuous wave operation type)

Focusing optical system: Focused irradiation using a single lens (f=40 mm to 100 mm), with a beam diameter on the first joining portion surface being 300 μm The above-described power density is a power density on the first joining portion surface of the first resin member, and is determined by dividing a set power value of the laser-light irradiation apparatus by the area of a region in which the laser light is focused.

factured by AS ONE Corporation, thickness: 0.2 mm) and a lateral surface (second joining portion) of a plate-shaped second resin member (manufactured by AS ONE Corporation, thickness: 0.2 mm) are arranged in tight contact with each other. In the present example, the first resin member and the second resin member are formed of polyethylene. A laser light(s) is emitted to an interface between the first joining portion and the second joining portion at atmospheric pressure under the following conditions. Subsequently, it is confirmed whether the first resin member and the second resin member are joined to each other. The results are shown in Table 2.

Condition 1 (Example): Irradiation with only Laser light 1 (wavelength: 375 nm, power density: 0.7 kW/cm$^2$)

Condition 2 (Example): Irradiation with only Laser light 2 (wavelength: 405 nm, power density: 1.13 kW/cm$^2$)

Condition 3 (Comparative Example): Irradiation with only Laser light 5 (wavelength: 450 nm, power density: 2.60 kW/cm$^2$)

Condition 4 (Example): Simultaneous irradiation with Laser light 3 (wavelength: 375 nm, power density: 0.45 kW/cm$^2$) and Laser light 4 (wavelength: 405 nm, power density: 0.45 kW/cm$^2$)

Condition 5 (Example): Simultaneous irradiation with Laser light 1 (wavelength: 375 nm, power density: 0.45 kW/cm$^2$) and Laser light 5 (wavelength: 450 nm, power density: 1.92 kW/cm$^2$)

Condition 6 (Example): Irradiation with Laser light 2 (wavelength: 405 nm, power density: 0.85 kW/cm$^2$) and Laser light 5 (wavelength: 450 nm, power density: 2.60 kW/cm$^2$)

It is to be noted that the following types of laser lights and a focusing optical system were used.

Laser lights 1 and 3: Semiconductor laser lights having a wavelength of 375 nm (continuous wave operation type)

Laser lights 2 and 4: Semiconductor laser lights having a wavelength of 405 nm (continuous wave operation type)

TABLE 1

| | Example Condition 1 | Example Condition 2 | Comparative Example Condition 3 | Example Condition 4 | Example Condition 5 | Example Condition 6 |
|---|---|---|---|---|---|---|
| Laser Light Wavelength | 375 nm | 405 nm | 450 nm | 375 nm + 405 nm | 375 nm + 450 nm | 405 nm + 450 nm |
| Power Density (kW/cm$^2$) | 1.20 | 1.69 | 2.6 | 0.45(375 nm) + 1.58(405 nm) | 0.6(375 nm) + 2.5(450 nm) | 1.64(405 nm) + 2.60(450 nm) |
| Evaluation for Joining | ○ | ○ | x | ○ | ○ | ○ |

As shown in Table 1 described above, the first resin member and the second resin member can be joined to each other by irradiating the first resin member with a laser light(s) having a wavelength in a range from 350 nm to 420 nm (Conditions 1, 2, 4 to 6). In contrast, it is difficult to join the first resin member and the second resin member to each other by irradiation with a laser light having a wavelength of 450 nm (Condition 3). Similar results can be obtained when the first resin member and the second resin member are formed of polypropylene.

(Experimental Example 2) Joining 2 of resin members containing olefin-based polymers A lateral surface (first joining portion) of a plate-shaped first resin member (manu- Laser light 5: Semiconductor laser light having a wavelength of 450 nm (continuous wave operation type)

Focusing optical system: Focused irradiation using a single lens (f=40 mm to 100 mm) with a beam diameter on the interface between the first joining portion and the second joining portion being 330 μm The above-described power density is a power density on the first joining portion surface, and is determined by dividing a set power value of the laser-light irradiation apparatus by the area of a region in which the laser light is focused.

TABLE 2

| | Example Condition 1 | Example Condition 2 | Comparative Example Condition 3 | Example Condition 4 | Example Condition 5 | Example Condition 6 |
|---|---|---|---|---|---|---|
| Laser Light Wavelength | 375 nm | 405 nm | 450 nm | 375 nm + 405 nm | 375 nm + 450 nm | 405 nm + 450 nm |
| Power Density (kW/cm$^2$) | 0.7 | 1.13 | 2.60 | 0.45(375 nm) + 0.45(405 nm) | 0.45(375 nm) + 1.92(450 nm) | 0.85(405 nm) + 2.60(450 nm) |
| Evaluation for Joining | ○ | ○ | x | ○ | ○ | ○ |

As shown in Table 2 described above, the first resin member and the second resin member can be joined to each other by irradiating the interface between the first resin member and the second resin member with a laser light(s) having a wavelength in a range from 350 nm to 420 nm (Conditions 1, 2, 4 to 6). In contrast, it is difficult to join the first resin member and the second resin member to each other by irradiation with a laser light having a wavelength of 450 nm (Condition 3). Similar results can be obtained when the first resin member and the second resin member are formed of polypropylene.

Figure 3:
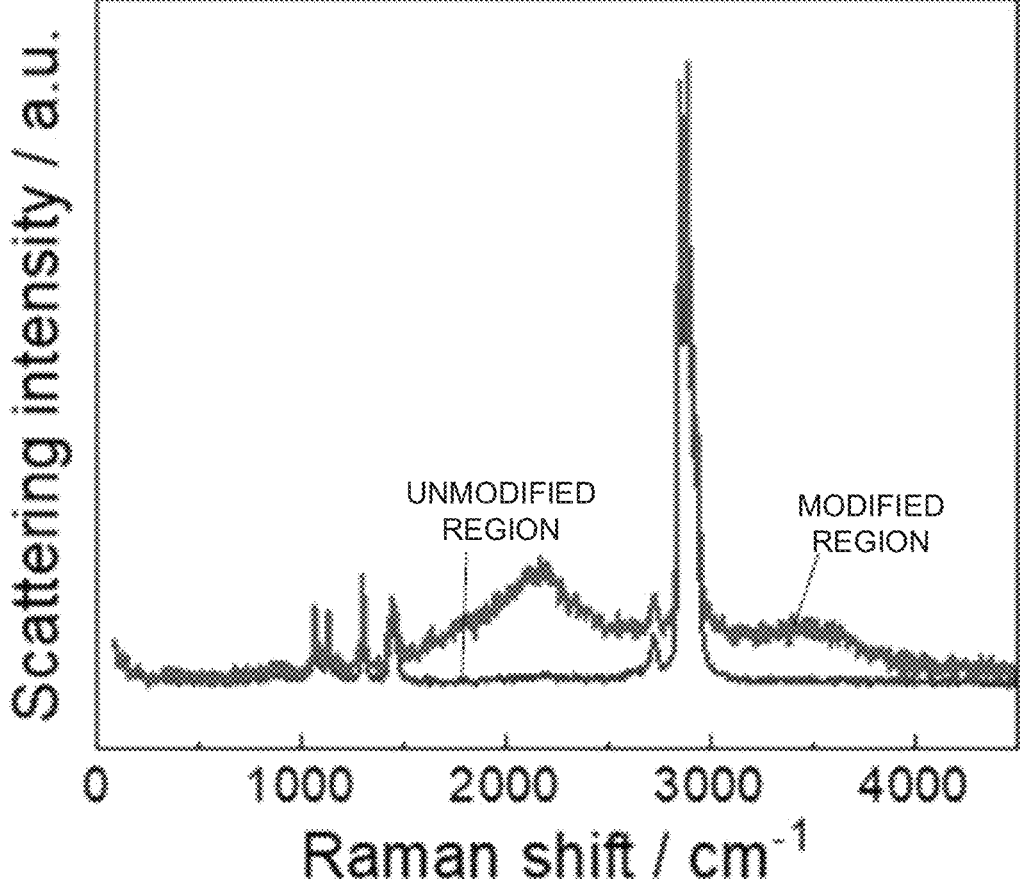
FIG. 3 is a spectrum obtained by analyzing, by Raman spectroscopy, a resin component formed by joining a first resin member containing polyethylene and a second resin member containing polyethylene in Experimental Example 2 of the present disclosure.
Figure 4:
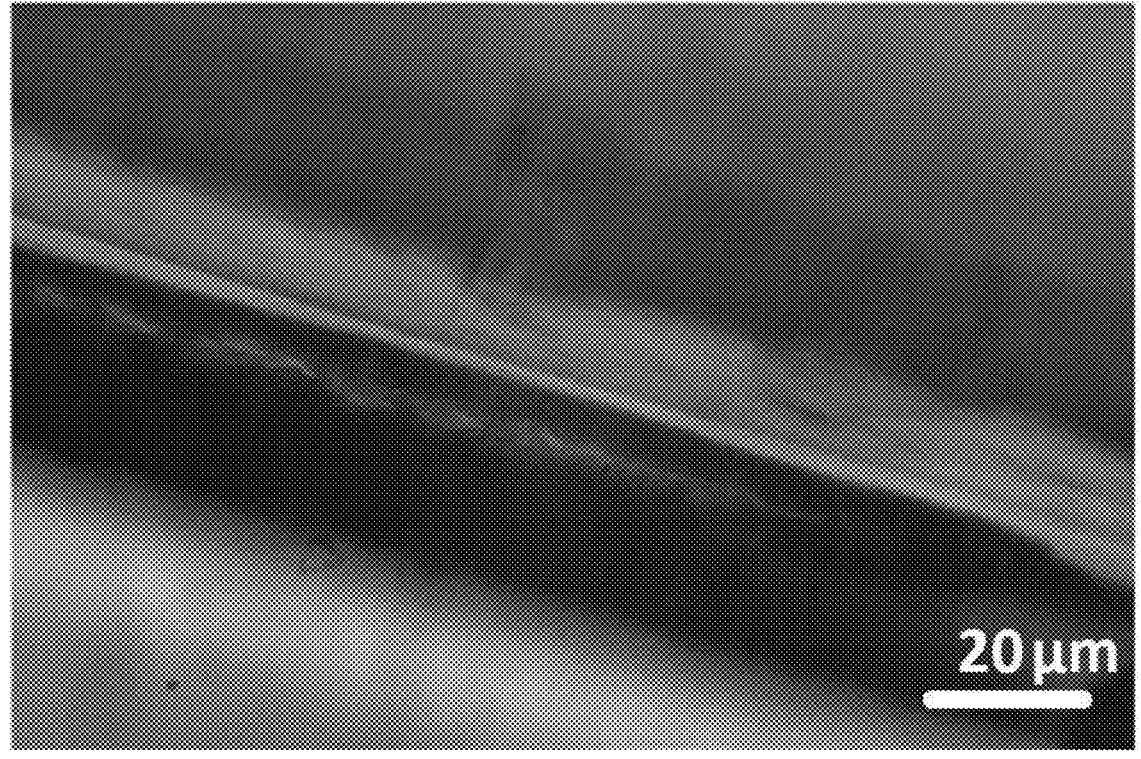
FIG. 4 is an image of a modified region in a joining region of the resin component formed by joining the first resin member containing polyethylene and the second resin member containing polyethylene in Experimental Example 2 of the present disclosure.

FIG. 3 shows a spectrum obtained by analyzing the resin component manufactured in the above-described Example (Condition 4) by confocal Raman spectroscopy. In the analysis by confocal Raman spectroscopy, a 532 nm laser light is introduced as excitation light into an inverted optical microscope (manufactured by NIKON Corporation, Eclipse TE2), and the sample surface is irradiated with the laser light through a ×40 objective lens (N.A.=0.6). The Raman-scattered light from the sample is passed through a pinhole (50 μm in diameter), dispersed by a spectroscope, and detected by a cooled CCD camera (−70° C.). A GLM-CW-010A manufactured by HC PHOTONICS Corporation is used as an excitation light source, and a Nanofinder 30 manufactured by Tokyo Instruments, Inc. is used as the spectroscope and the cooled CCD camera. The unmodified region in FIG. 3 indicates a region that is not irradiated with the laser light, and the modified region indicates a region that is modified by the laser light in the joining region of the first resin member and the second resin member. As shown in FIG. 3, in the modified region, a peak is observed in a range from 3100 cm$^{-1}$ to 3800 cm$^{-1}$. This peak is considered to be derived from a bond generated by a reaction of the olefin-based polymer with oxygen. Peaks are also observed in a range from 1500 cm$^{-1}$ to 2500 cm$^{-1}$. These are considered to be attributable to —C—C— triple bonds and double bonds, and are considered to indicate bond cleavage resulting from light absorption. Similarly, in the modified region of the resin component in which the first resin member and the second resin member are formed of polypropylene, a peak is observed in a range from 3100 cm$^{-1}$ to 3800 cm$^{-1}$. It is to be noted that FIG. 4 shows an image of the modified region in the joining region of the resin component obtained by joining the first resin member containing polyethylene and the second resin member containing polyethylene.

(Experimental Example 3) Joining of Resin Members Containing Fluorine-Based Polymers A third joining portion of a plate-shaped third resin member (manufactured by MISUMI Group Inc., thickness: 0.2 mm) and a fourth joining portion of a plate-shaped fourth resin member (manufactured by MISUMI Group Inc., thickness: 0.2 mm) are faced with each other with a spacer (manufactured by MISUMI Group Inc., thickness: 0.3 mm) therebetween. In the present example, the third resin member and the fourth resin member are formed of polytetrafluoroethylene. A laser light(s) is linearly emitted along the third joining portion of the third resin member at atmospheric pressure under the following conditions. A focal position was set on the third joining portion surface, that is, a surface of the third resin member on the fourth member side. Subsequently, the spacer is removed, and the third resin member and the fourth resin member are brought into tight contact with each other. It is to be noted that the time from the start of laser light irradiation to the tight contact of the third resin member and the fourth resin member was within 3 seconds. It is confirmed whether the third resin member and the fourth resin member after the joining are joined to each other as in Experimental Example 1. The results are shown in Table 3.

Condition 1 (Example): Irradiation with only Laser light 6 (wavelength: 375 nm, power density: 1.4 kW/cm$^2$)

Condition 2 (Example): Irradiation with only Laser light 7 (wavelength: 405 nm, power density: 2.5 kW/cm$^2$)

Condition 3 (Comparative Example): Irradiation with only Laser light 10 (wavelength: 450 nm, power density: 2.6 kW/cm$^2$)

Condition 4 (Example): Simultaneous irradiation with Laser light 8 (wavelength: 375 nm, power density: 1.0 kW/cm$^2$) and Laser light 9 (wavelength: 405 nm, power density: 2.0 kW/cm$^2$)

Condition 5 (Example): Simultaneous irradiation with Laser light 6 (wavelength: 375 nm, power density: 1.2 kW/cm$^2$) and Laser light 10 (wavelength: 450 nm, power density: 3.2 kW/cm$^2$)

Condition 6 (Example): Simultaneous irradiation with Laser light 7 (wavelength: 405 nm, power density: 2.5 kW/cm$^2$) and Laser light 10 (wavelength: 450 nm, power density: 4.0 kW/cm$^2$)

It is to be noted that the following types of laser lights and a focusing optical system are used.

Laser lights 6 and 8: Semiconductor laser lights having a wavelength of 375 nm (continuous wave operation type)

Laser lights 7 and 9: Semiconductor laser lights having a wavelength of 405 nm (continuous wave operation type)

Laser light 10: Semiconductor laser light having a wavelength of 450 nm (continuous wave operation type)

Focusing optical system: Focused irradiation using a single lens (f=40 mm to 100 mm) with a beam diameter on the third joining portion surface being 330 μm The above-described power density is a power density on the third joining portion surface, and is determined in the same manner as that in Experimental Example 1.

TABLE 3

| | Example Condition 1 | Example Condition 2 | Comparative Example Condition 3 | Example Condition 4 | Example Condition 5 | Example Condition 6 |
|---|---|---|---|---|---|---|
| Laser Light Wavelength | 375 nm | 405 nm | 450 nm | 375 nm + 405 nm | 375 nm + 450 nm | 405 nm + 450 nm |
| Power Density (kW/cm$^2$) | 1.4 | 2.5 | 2.6 | 1.0(375 nm) + 2.0(405 nm) | 0.45(375 nm) + 2.60(450 nm) | 1.64(405 nm) + 2.60(450 nm) |
| Evaluation for Joining | ○ | ○ | x | ○ | ○ | ○ |

As shown in Table 3 described above, the third resin member and the fourth resin member can be joined to each other by irradiating the third joining portion of the third resin member with a laser light(s) having a wavelength in a range from 350 nm to 420 nm (Conditions 1, 2, 4 to 6). In contrast, it is difficult to join the third resin member and the fourth resin member by irradiation with a laser light having a wavelength of 450 nm (Condition 3). Similar results can be obtained when the third resin member and the fourth resin member are formed of ethylene-tetrafluoroethylene copolymers.

(Experimental Example 4) Joining 2 of Resin Members Containing Fluorine-Based Polymers A lateral surface (third joining portion) of a plate-shaped third resin member (manufactured by MISUMI Group Inc., thickness: 1 mm) and a lateral surface (fourth joining portion) of a plate-shaped fourth resin member (manufactured by MISUMI Group Inc., thickness: 1 mm) were arranged in tight contact with each other. In the present example, the third resin member and the fourth resin member are formed of polytetrafluoroethylene. A laser light(s) was emitted to an interface between the third joining portion and the fourth joining portion at atmospheric pressure under each of the following conditions. Subsequently, it is con- Condition 5 (Example): Simultaneous irradiation with Laser light 6 (wavelength: 375 nm, power density: 0.6 kW/cm$^2$) and Laser light 10 (wavelength: 450 nm, power density: 2.5 kW/cm$^2$)

Condition 6 (Example): Irradiation with Laser light 7 (wavelength: 405 nm, power density: 2.0 kW/cm$^2$) and Laser light 10 (wavelength: 450 nm, power density: 4.0 kW/cm$^2$)

It is to be noted that the following types of laser lights and a focusing optical system are used.

Laser lights 6 and 8: Semiconductor laser lights having a wavelength of 375 nm (continuous wave operation type)

Laser lights 7 and 9: Semiconductor laser lights having a wavelength of 405 nm (continuous wave operation type)

Laser light 10: Semiconductor laser light having a wavelength of 450 nm (continuous wave operation type)

Focusing optical system: Focused irradiation using a single lens (f=40 to 100 mm) with a beam diameter on the interface between the third joining portion and the fourth joining portion being 330 μm The above-described power density is a power density on the third joining portion surface, and is determined in the same manner as that in Experimental Example 2.

TABLE 4

| | Example Condition 1 | Example Condition 2 | Comparative Example Condition 3 | Example Condition 4 | Example Condition 5 | Example Condition 6 |
|---|---|---|---|---|---|---|
| Laser Light Wavelength | 375 nm | 405 nm | 450 nm | 375 nm + 405 nm | 375 nm + 450 nm | 405 nm + 450 nm |
| Power Density (kW/cm$^2$) | 0.9 | 2.2 | 2.60 | 0.45(375 nm) + 1.69(405 nm) | 0.6(375 nm) + 2.5(450 nm) | 2.0(405 nm) + 4.0(450 nm) |
| Evaluation for Joining | ○ | ○ | x | ○ | ○ | ○ | firmed whether the third resin member and the fourth resin member are joined to each other as in Experimental Example 2. The results are shown in Table 4.

Condition 1 (Example): Irradiation with only Laser light 6 (wavelength: 375 nm, power density: 0.9 kW/cm$^2$)

Condition 2 (Example): Irradiation with only Laser light 7 (wavelength: 405 nm, power density: 2.2 kW/cm$^2$)

Condition 3 (Comparative Example): Irradiation with only Laser light 10 (wavelength: 450 nm, power density: 2.60 kW/cm$^2$)

Condition 4 (Example): Simultaneous irradiation with Laser light 8 (wavelength: 375 nm, power density: 0.45 kW/cm$^2$) and Laser light 9 (wavelength: 405 nm, power density: 1.69 kW/cm$^2$)

As shown in Table 4 described above, the third resin member and the fourth resin member can be joined to each other by irradiating the interface between the third resin member and the fourth resin member with a laser light(s) having a wavelength in a range from 350 nm to 420 nm (Conditions 1, 2, 4 to 6). Similar results can be obtained when the third resin member and the fourth resin member are formed of ethylene-tetrafluoroethylene copolymers.

Figure 5:
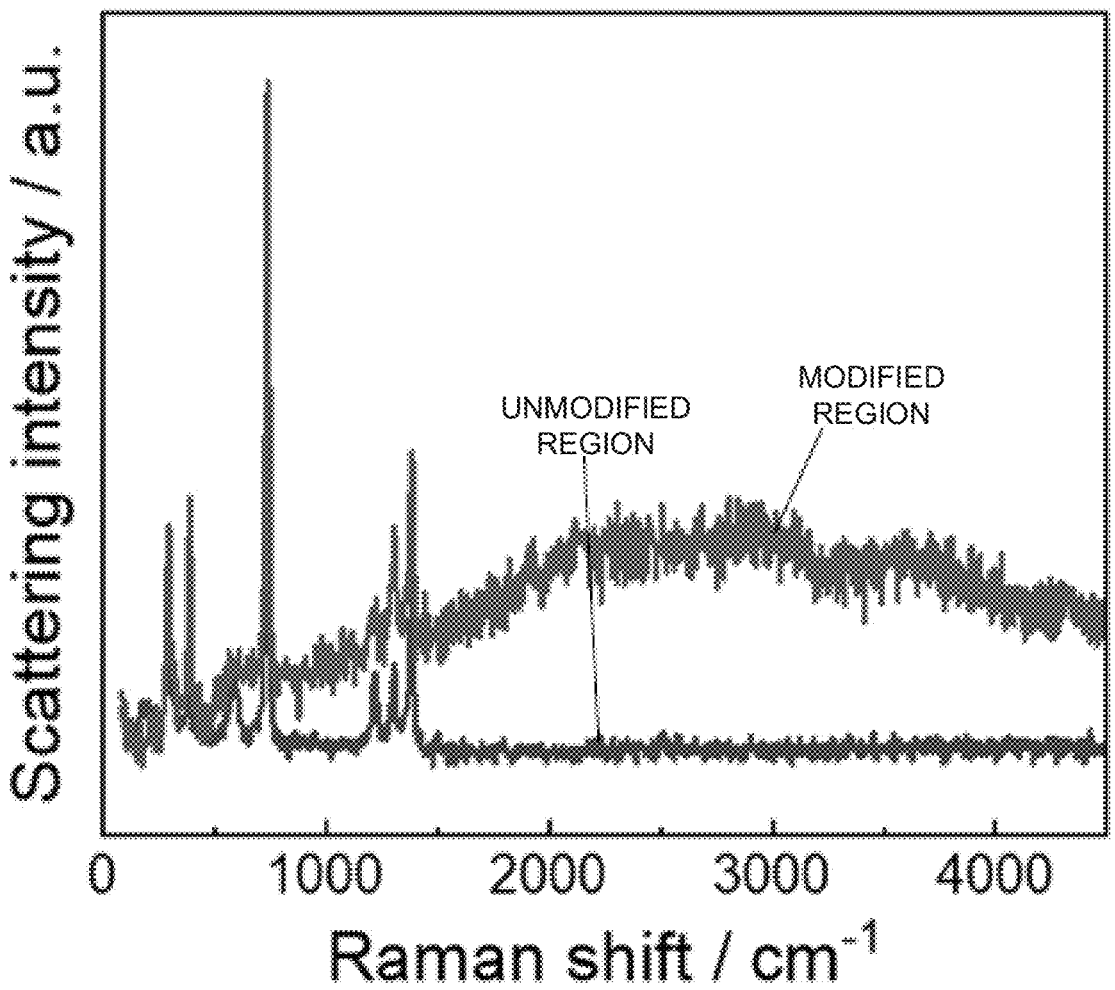
FIG. 5 is a spectrum obtained by analyzing, by Raman spectroscopy, a resin component formed by joining a third resin member containing polytetrafluoroethylene and a fourth resin member containing polytetrafluoroethylene in Experimental Example 4 of the present disclosure.

FIG. 5 shows a spectrum obtained by analyzing the resin component manufactured in the above-described Example (Condition 4) by confocal Raman spectroscopy. In the analysis by the confocal Raman spectroscopy, a 532 nm laser light is introduced as excitation light into an inverted optical microscope (manufactured by NIKON Corporation, Eclipse TE2), and the sample surface is irradiated with the laser light through a ×40 objective lens (N.A.=0.6). The Raman-scattered light from the sample is passed through a pinhole (50 µm in diameter), dispersed by a spectroscope, and detected by a cooled CCD camera (−70° C.). A GLM-CW-010A manufactured by HC PHOTONICS Corporation is used as an excitation light source, and a Nanofinder 30 manufactured by Tokyo Instruments, Inc. is used as the spectroscope and the cooled CCD camera. The unmodified region in FIG. 5 indicates a region that is not irradiated with the laser light, and the modified region indicates a region that is modified by the laser light in the joining region of the third resin member and the fourth resin member. As shown in FIG. 5, in the modified region, Raman-scattered signals are observed in a range from $1500\,\mathrm{cm}^{-1}$ to $4000\,\mathrm{cm}^{-1}$. These Raman-scattered signals are considered to be derived from a bond generated by a reaction of the fluorine-based polymer with oxygen.

The present disclosure includes the following aspects of a manufacturing method of a resin component and the resin component.

Aspect 1

A manufacturing method of a resin component, comprising: providing a first resin member containing a first olefin-based polymer and a second resin member containing a second olefin-based polymer; and joining the first resin member and the second resin member to each other at a first joining portion of the first resin member and a second joining portion of the second resin member, wherein in the joining of the first resin member and the second resin member to each other, a laser light having a peak wavelength in a range from 350 nm to 420 nm is emitted to the first joining portion in a presence of oxygen so as to cause multiphoton excitation of the first joining portion.

Aspect 2

The manufacturing method of a resin component, according to Aspect 1, wherein in the joining of the first resin member and the second resin member to each other, the second joining portion is also irradiated with the laser light so as to cause multiphoton excitation of the second joining portion.

Aspect 3

The manufacturing method of a resin component, according to Aspect 1 or 2, wherein in the joining of the first resin member and the second resin member to each other, the first joining portion is irradiated with the laser light in a state in which the first joining portion and the second joining portion are arranged with a clearance between the first joining portion and the second joining portion, and subsequently, the first joining portion and the second joining portion are brought into contact with each other.

Aspect 4

The manufacturing method of a resin component, according to Aspect 3, wherein a beam diameter of the laser light on a surface of the first joining portion is in a range from 200 µm to 500 µm.

Aspect 5

The manufacturing method of a resin component, according to Aspect 1 or 2, wherein in the joining of the first resin member and the second resin member to each other, the first joining portion and the second joining portion are brought into contact with each other, and subsequently, an interface between the first joining portion and the second joining portion is irradiated with the laser light.

Aspect 6

The manufacturing method of a resin component, according to Aspect 5, wherein a beam diameter of the laser light on the interface between the first joining portion and the second joining portion is in a range from 200 µm to 500 µm.

Aspect 7

The manufacturing method of a resin component, according to any one of Aspects 1 to 6, wherein the laser light includes a first laser light having a peak wavelength in a range from 350 nm to less than 390 nm and having a power density on a surface of the first joining portion of 0.45 $\mathrm{kW/cm}^2$ or more.

Aspect 8

The manufacturing method of a resin component, according to any one of Aspects 1 to 6, wherein
the laser light includes a second laser light having a peak wavelength in a range from 390 nm to 420 nm and having a power density on a surface of the first joining portion of 0.85 $\mathrm{kW/cm}^2$ or more.

Aspect 9

The manufacturing method of a resin component, according to any one of Aspects 1 to 6, wherein the laser light includes: a third laser light having a peak wavelength in a range from 350 nm to less than 390 nm and having a power density on a surface of the first joining portion of 0.45 $\mathrm{kW/cm}^2$ or more; and a fourth laser light having a peak wavelength in a range from 390 nm to 420 nm and having a power density on the surface of the first joining portion of 0.45 $\mathrm{kW/cm}^2$ or more.

Aspect 10

The manufacturing method of a resin component, according to Aspect 9, wherein irradiation with the third laser light and irradiation with the fourth laser light are performed simultaneously.

Aspect 11

The manufacturing method of a resin component, according to any one of Aspects 7 to 10, wherein in the joining of the first resin member and the second resin member to each other, a fifth laser light having a peak wavelength in a range from more than 420 nm to 460 nm is further emitted.

Aspect 12

A manufacturing method of a resin component, comprising: providing a third resin member containing a first fluorine-based polymer and a fourth resin member containing a second fluorine-based polymer; and joining the third resin member and the fourth resin member to each other at a third joining portion of the third resin member and a fourth joining portion of the fourth resin member, wherein in the joining of the third resin member and the fourth resin member to each other, a laser light having a peak wavelength in a range from 350 nm to 420 nm is emitted to the third joining portion in a presence of oxygen so as to cause multiphoton excitation of the third joining portion.

Aspect 13

The manufacturing method of a resin component, according to Aspect 12, wherein in the joining of the third resin member and the fourth resin member to each other, the fourth joining portion is also irradiated with the laser light so as to cause multiphoton excitation of the fourth joining portion.

Aspect 14

The manufacturing method of a resin component, according to Aspect 12 or 13, wherein in the joining of the third resin member and the fourth resin member to each other, the third joining portion is irradiated with the laser light in a state in which the third joining portion and the fourth joining portion are arranged with a clearance between the third joining portion and the fourth joining portion, and subsequently, the third joining portion and the fourth joining portion are brought into contact with each other.

Aspect 15

The manufacturing method of a resin component, according to Aspect 14, wherein a beam diameter of the laser light on a surface of the third joining portion is in a range from 200 μm to 500 μm.

Aspect 16

The manufacturing method of a resin component, according to Aspect 12 or 13, wherein in the joining of the third resin member and the fourth resin member to each other, the third joining portion and the fourth joining portion are brought into contact with each other, and subsequently, an interface between the third joining portion and the fourth joining portion is irradiated with the laser light.

Aspect 17

The manufacturing method of a resin component, according to Aspect 16, wherein a beam diameter of the laser light on the interface between the third joining portion and the fourth joining portion is in a range from 200 μm to 500 μm.

Aspect 18

The manufacturing method of a resin component, according to any one of Aspects 12 to 17, wherein the laser light includes a sixth laser light having a peak wavelength in a range from 350 nm to less than 390 nm and having a power density on a surface of the third joining portion of 0.45 $kW/cm^2$ or more.

Aspect 19

The manufacturing method of a resin component, according to any one of Aspects 12 to 17, wherein the laser light includes a seventh laser light having a peak wavelength in a range from 390 nm to 420 nm and having a power density on a surface of the third joining portion of 1.64 $kW/cm^2$ or more.

Aspect 20

The manufacturing method of a resin component, according to any one of Aspects 12 to 17, wherein the laser light includes: an eighth laser light having a peak wavelength in a range from 350 nm to less than 390 nm and having a power density on a surface of the third joining portion of 0.45 $kW/cm^2$ or more; and a ninth laser light having a peak wavelength in a range from 390 nm to 420 nm and having a power density on the surface of the third joining portion of 1.69 $kW/cm^2$ or more.

Aspect 21

The manufacturing method of a resin component, according to Aspect 20, wherein irradiation with the eighth laser light and irradiation with the ninth laser light are performed simultaneously.

Aspect 22

The manufacturing method of a resin component, according to any one of Aspects 18 to 21, wherein in the joining of the third resin member and the fourth resin member to each other, a tenth laser light having a peak wavelength in a range from more than 420 nm to 460 nm is further emitted.

Aspect 23

The manufacturing method of a resin component, according to any one of Aspects 1 to 22, wherein the laser light is a continuous-wave laser light.

Aspect 24

A resin component comprising: a first resin member containing a first olefin-based polymer and a second resin member containing a second olefin-based polymer, the first resin member and the second resin member being joined to each other; and a modified region in a joining region of the first resin member and the second resin member.

Aspect 25

The resin component according to Aspect 24, wherein the modified region includes a region in which a peak is observed in each of a range from 1500 $cm^{-1}$ to 2500 $cm^{-1}$ and a range from 3100 $cm^{-1}$ to 3800 $cm^{-1}$ by Raman spectroscopy analysis.

Aspect 26

A resin component comprising: a third resin member containing a first fluorine-based polymer and a fourth resin member containing a second fluorine-based polymer, the third resin member and the fourth resin member being joined to each other; and a modified region in a joining region of the third resin member and the fourth resin member.

Aspect 27

The resin component according to Aspect 26, wherein the modified region includes a region in which a Raman-scattered signal is observed in a range from 1500 cm$^{-1}$ to 4000 cm$^{-1}$ by Raman spectroscopy analysis.

Aspect 28

The resin component according to any one of Aspects 24 to 27, wherein a width of the modified region is 300 μm or less.

With the manufacturing method of a resin component of the present disclosure, olefin-based polymers can be joined to each other and fluorine-based polymers can be joined to each other by irradiation with laser light. Therefore, it is a very useful technique for manufacturing various electronic components and devices, for example.

What is claimed is:

1. A manufacturing method of a resin component, comprising:

providing a first resin member containing a first fluorine-based polymer and a second resin member containing a second fluorine-based polymer; and joining the first resin member and the second resin member to each other at a first joining portion of the first resin member and a second joining portion of the second resin member by irradiating the first joining portion of the first resin member with a laser light having a peak wavelength in a range from 350 nm to 420 nm in a presence of oxygen so as to cause multiphoton excitation of the first joining portion of the first resin member.

2. The manufacturing method of a resin component according to claim 1, wherein the joining of the first resin member and the second resin member to each other includes irradiating the second joining portion of the second resin member with the laser light so as to cause multiphoton excitation of the second joining portion of the second resin member.

3. The manufacturing method of a resin component according to claim 1, wherein the joining of the first resin member and the second resin member to each other includes irradiating the first joining portion of the first resin member with the laser light in a state in which the first joining portion of the first resin member is spaced apart from and the second joining portion of the second resin member, and subsequently, bringing the first joining portion of the first resin member and the second joining portion of the second resin member into contact with each other.

4. The manufacturing method of a resin component according to claim 3, wherein a beam diameter of the laser light on a surface of the first joining portion of the first resin member is in a range from 200 μm to 500 μm.

5. The manufacturing method of a resin component according to claim 1, wherein the joining of the first resin member and the second resin member to each other includes

28 bringing the first joining portion and the second joining portion into contact with each other, and subsequently, irradiating an interface between the first joining portion of the first resin member and the second joining portion of the second resin member with the laser light.

6. The manufacturing method of a resin component according to claim 5, wherein a beam diameter of the laser light on the interface between the first joining portion of the first resin member and the second joining portion of the second resin member is in a range from 200 μm to 500 μm.

7. The manufacturing method of a resin component according to claim 1, wherein the laser light includes a laser light having a peak wavelength in a range from 350 nm to less than 390 nm and having a power density of 0.45 kW/cm$^2$ or more on a surface of the first joining portion of the first resin member.

8. The manufacturing method of a resin component according to claim 1, wherein the laser light includes a laser light having a peak wavelength in a range from 390 nm to 420 nm and having a power density of 1.64 kW/cm$^2$ or more on a surface of the first joining portion of the first resin member.

9. The manufacturing method of a resin component according to claim 1, wherein the laser light includes a laser light having a peak wavelength in a range from 350 nm to less than 390 nm and having a power density of 0.45 kW/cm$^2$ or more on a surface of the first joining portion of the first resin member; and a ninth laser light having a peak wavelength in a range from 390 nm to 420 nm and having a power density of 1.69 kW/cm$^2$ or more on the surface of the first joining portion of the first resin member.

10. The manufacturing method of a resin component according to claim 9, wherein the joining of the first resin member and the second resin member to each other includes irradiating the first joining portion of the first resin member with the laser light having a peak wavelength in a range from 350 nm to less than 390 nm and having a power density of 0.45 kW/cm$^2$ or more and irradiation with the laser light having a peak wavelength in a range from 390 nm to 420 nm and having a power density of 1.69 kW/cm$^2$ or more, simultaneously.

11. The manufacturing method of a resin component according to claim 7, wherein the joining of the first resin member and the second resin member to each other includes further irradiating the first joining portion of the first resin member with a tenth laser light having a peak wavelength in a range from more than 420 nm to 460 nm.

12. The manufacturing method of a resin component according to claim 1, wherein the laser light is a continuous-wave laser light.

* * * * *